(12) United States Patent
Kanda et al.

(10) Patent No.: US 11,078,861 B2
(45) Date of Patent: Aug. 3, 2021

(54) FUEL INJECTION CONTROL DEVICE AND FUEL INJECTION CONTROL METHOD FOR INTERNAL COMBUSTION ENGINE

(71) Applicant: Hitachi Astemo, Ltd., Hitachinaka (JP)

(72) Inventors: Kohsuke Kanda, Hitachinaka (JP); Atsushi Murai, Hitachinaka (JP); Yoshitatsu Nakamura, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 0 days.

(21) Appl. No.: 17/048,499

(22) PCT Filed: Mar. 12, 2019

(86) PCT No.: PCT/JP2019/010069
§ 371 (c)(1),
(2) Date: Oct. 16, 2020

(87) PCT Pub. No.: WO2019/202883
PCT Pub. Date: Oct. 24, 2019

(65) Prior Publication Data
US 2021/0040910 A1    Feb. 11, 2021

(30) Foreign Application Priority Data

Apr. 19, 2018  (JP) .............................. JP2018-080572

(51) Int. Cl.
*F02D 41/18*    (2006.01)
*F02D 41/10*    (2006.01)

(52) U.S. Cl.
CPC ......... *F02D 41/182* (2013.01); *F02D 41/107* (2013.01); *F02D 2200/04* (2013.01); *F02D 2200/0602* (2013.01); *F02D 2200/101* (2013.01)

(58) Field of Classification Search
CPC .. F02D 41/182; F02D 41/107; F02D 2200/04; F02D 2200/0602; F02D 2200/101
See application file for complete search history.

(56) References Cited

U.S. PATENT DOCUMENTS 5,427,069 A *  6/1995  Tomisawa ............. F02D 41/345
                                              123/478
7,246,603 B2 *  7/2007  Hattori .................. F02D 41/182
                                              123/478
(Continued)

FOREIGN PATENT DOCUMENTS

JP    2003-254072 A    9/2003
JP    2008-286163 A    11/2008
(Continued)

OTHER PUBLICATIONS

International Search Report (PCT/ISA/210 and PCT/ISA/220) issued in PCT Application No. PCT/JP2019/010069 dated May 14, 2019 with English translation (seven pages).
(Continued)

*Primary Examiner* — Carl C Staubach
(74) *Attorney, Agent, or Firm* — Crowell & Moring LLP

(57) ABSTRACT

The fuel injection control device and fuel injection control method according to the present invention allow a fuel injection device to perform fuel injection in the case where an open period of the intake valve and an open period of the exhaust valve overlap with each other, and sets the timing to start injection to the closing timing of the exhaust valve, and that sets the timing to end injection to the timing at which a deceleration rate of intake air speed becomes the local maximum. As such, the homogeneity of in-cylinder air-fuel mixture can be improved while preventing the adhesion of fuel to the inner wall of the intake port and the blow-through of fuel to the exhaust passage from occurring.

11 Claims, 13 Drawing Sheets

(56) References Cited

U.S. PATENT DOCUMENTS

| | | | | |
|---|---|---|---|---|
| 8,548,717 B2* | 10/2013 | Lang | ............... | F02D 41/3094 |
| | | | | 701/105 |
| 2007/0017488 A1* | 1/2007 | Hattori | ............... | F02D 41/182 |
| | | | | 123/488 |
| 2008/0087250 A1* | 4/2008 | Robinson | ............... | F02D 41/266 |
| | | | | 123/445 |
| 2009/0150052 A1* | 6/2009 | Kumano | ............... | F02D 41/006 |
| | | | | 701/103 |
| 2014/0158092 A1 | 6/2014 | Sukegawa et al. | | |

FOREIGN PATENT DOCUMENTS

| | | |
|---|---|---|
| JP | 2009-138655 A | 6/2009 |
| JP | 2009-209769 A | 9/2009 |
| JP | 2013-60863 A | 4/2013 |
| JP | 2014-114718 A | 6/2014 |
| JP | 2015-59456 A | 3/2015 |
| JP | 2016-183649 A | 10/2016 |
| JP | 2017-210907 A | 11/2017 |

OTHER PUBLICATIONS

Japanese-language Written Opinion (PCT/ISA/237) issued in PCT Application No. PCT/JP2019/010069 dated May 14, 2019 with English translation (six pages).

Japanese language Office Action issued in Japanese Application No. 2018-080572 dated Jun. 8, 2021 with English translation (nine (9) pages).

* cited by examiner

FUEL INJECTION CONTROL DEVICE AND FUEL INJECTION CONTROL METHOD FOR INTERNAL COMBUSTION ENGINE

TECHNICAL FIELD

The present invention relates to a fuel injection control device and to a fuel injection control method for an internal combustion engine, and more particularly, relates to a technique for controlling a period of fuel injection by a fuel injection device.

BACKGROUND ART

The fuel injection control device of Patent Document 1 sets a period of fuel injection such that fuel is separately injected before and after a valve overlap period so that fuel is prevented from blowing through an exhaust passage during the valve overlap period in a port injection type internal combustion engine, at the time of high loading such as the time of supercharging performed by a turbocharger.

REFERENCE DOCUMENT LIST

Patent Document

Patent Document 1: JP 2009-209769 A

SUMMARY OF THE INVENTION

Problem to be Solved by the Invention

If fuel is injected separately before and after the valve overlap period, fuel that is injected before the valve overlap period adheres to an inner wall of the intake port because the intake air is blown back when an intake valve opens. When fuel spray adheres to the inner wall of the intake port, the amount of the fuel spray directly entering into a cylinder reduces and the temperature in the combustion chamber does not drop as much with vaporization of fuel, and thus, knocking may likely to occur.

On the other hand, if fuel is injected after the valve overlap period, fuel spray can be carried by the intake air flow and directly injected into the cylinder, and thus, the fuel adhesion to the inner wall of the intake port can be reduced.

However, the closer an intake bottom dead center is, the more the intake air speed is reduced. Thus, if the timing to end injection is late, a fuel injection device injects fuel under the condition of low intake air speed.

When the intake air speed is low, fuel does not mix well with air. Thus, if the timing to end injection is late during the fuel injection after the valve overlap period, the air-fuel mixture homogeneity in the cylinder becomes worse so that the fuel efficiency deteriorates.

The present invention has been made in view of such conventional circumstances, and an object of the present invention is to provide a fuel injection control device and a fuel injection control method for an internal combustion engine which can improve the homogeneity of in-cylinder air-fuel mixture and prevent the adhesion of fuel to the inner wall of the intake port and the blow-through of fuel to an exhaust passage from occurring.

Means for Solving the Problem

According to an aspect of the present invention, a fuel injection control device includes an injection period control unit that lets the fuel injection device perform fuel injection, as an open period of the intake valve and an open period of an exhaust valve overlap with each other, and that sets a timing to start injection to a closing timing of an exhaust valve, and a timing to end injection to a timing when a deceleration rate of intake air speed becomes a local maximum.

Furthermore, according to another aspect of the present invention, a fuel injection control method for an internal combustion engine includes: performing fuel injection by the fuel injection device, as an open period of the intake valve and an open period of an exhaust valve overlap with each other, and that sets a timing to start injection to a closing timing of the exhaust valve and a timing to end injection to a timing when a deceleration rate of intake air speed becomes a local maximum.

Effects of the Invention

According to the present invention as described above, it is possible to improve the homogeneity of in-cylinder air-fuel mixture and prevent the adhesion of fuel to the inner wall of the intake port and the blow-through of fuel to the exhaust passage from occurring.

MODE FOR CARRYING OUT THE INVENTION

An embodiment of the present invention will be described below.

Figure 1:
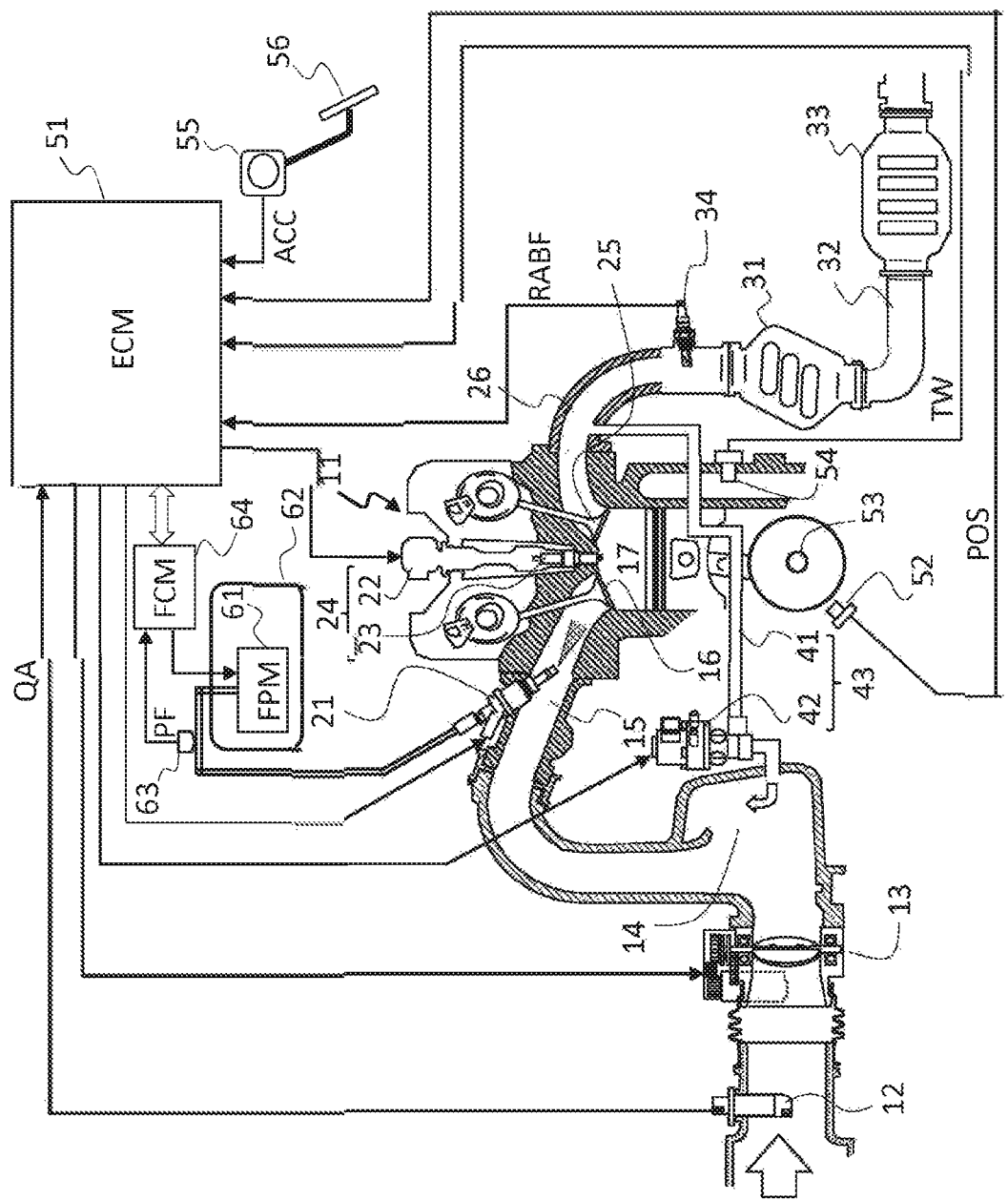
FIG. 1 is a view illustrating a system configuration of an internal combustion engine.

FIG. 1 is the system configuration view illustrating an example of a vehicular internal combustion engine 11 to which a fuel injection control device and fuel injection control method according to the present invention are applied.

Internal combustion engine 11 in FIG. 1 is a multi-cylinder gasoline engine.

The intake air in internal combustion engine 11 passes through, in the order of an air flow meter 12, an electronically controlled throttle valve 13 and an intake collector 14. The intake air then flows into a combustion chamber 17 via an intake port 15 and an intake valve 16 which are provided in each cylinder.

Each cylinder in internal combustion engine 11 includes an electromagnetic fuel injection valve 21 which is the fuel injection device.

Fuel injection valve 21 injects fuel into intake port 15 which is the intake pipe located upstream of intake valve 16.

Here, fuel injection valve 21 includes the means for promoting atomization of fuel.

The means for promoting atomization of fuel are the means for imparting a swirling force to fuel as disclosed in JP 2017-210907 A, and the means for hitting air to fuel spray as disclosed in JP 2008-286163 A, for example.

Figure 2:
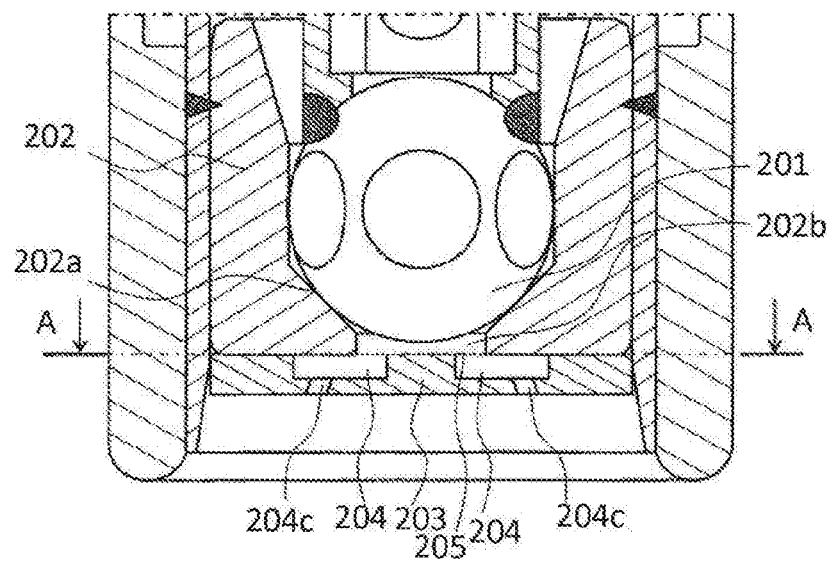
FIG. 2 is a cross-sectional view illustrating a tip of the fuel injection valve.
Figure 3:
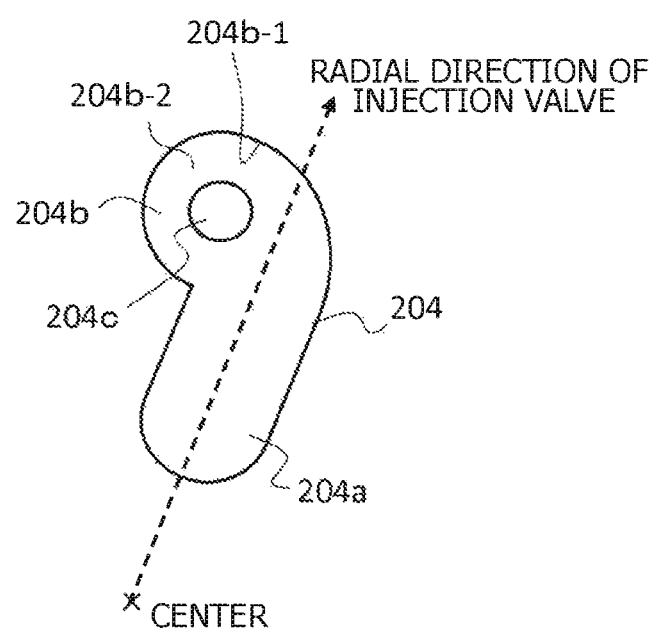
FIG. 3 is a view illustrating a means for imparting a swirling force to fuel in the fuel injection valve.

FIGS. 2 and 3 illustrate an example of the means for imparting a swirling force to fuel in fuel injection valve 21. FIG. 2 is the enlarged cross-sectional view of the tip of fuel injection valve 21, and FIG. 3 is the partially enlarged view (the enlarged view taken along the line A-A of FIG. 2) of the upper surface of the nozzle plate illustrated in FIG. 2.

The tip portion of fuel injection valve 21 includes a valve body 201, a nozzle body 202, and a nozzle plate 203.

Nozzle body 202 includes a valve seat surface 202a on which spherical valve body 201 is seated.

Nozzle plate 203 which is disposed at nozzle body 202 downstream of valve seat surface 202a includes a plurality of swirl fuel injection passages 204.

FIG. 3 is an enlarged view illustrating one of swirl fuel injection passages 204.

Each swirl fuel injection passage 204 has a swirl chamber introduction passage 204a that extends radially outward from the central portion of nozzle plate 203, a swirl chamber 204b provided downstream of swirl chamber introduction passage 204a, and an injection hole 204c provided in swirl chamber 204b.

Swirl chamber 204b includes a side surface 204b-1 that has an arc shape in the fuel flow direction, and a swirl passage 204b-2 through which fuel swirls.

When valve body 201 is lifted from valve seat surface 202a to generate a gap between valve body 201 and nozzle body 202, fuel flows out from the gap to an opening portion 202b of nozzle body 202 and flows into swirl chamber introduction passage 204a through a fuel inlet 205.

Swirl chamber 204b imparts a swirl force to fuel that flows into swirl chamber 204b through swirl chamber introduction passage 204a, and injects the fuel to the outside from injection hole 204c that is open in the central portion.

Fuel injection valve 21 lets swirling fuel injection passage 204 impart a swirling force to fuel to atomize the fuel spray, and thus can form the fuel spray with weak penetration. Therefore, the adhesion of fuel spray to, for example, the inner wall of intake port 15 and cylinder bore can be reduced, and the effect of improving fuel efficiency can be obtained.

Here, letting the fuel spray that is injected by fuel injection valve 21 be carried by the intake air flow can sufficiently exert the effect of improving fuel efficiency. Therefore, as will be described in detail later, the fuel injection by fuel injection valve 21 is the intake synchronous injection in which fuel is injected in the intake stroke.

A fuel tank 62 incorporates a fuel pump module 61 which is the fuel supply device.

Fuel pump module 61 boosts the fuel in fuel tank 62 to the target fuel pressure and supplies the fuel to fuel injection valve 21. Fuel injection valve 21 then injects an amount of fuel proportional to the valve opening time, that is, the injection pulse width.

Figure 4:
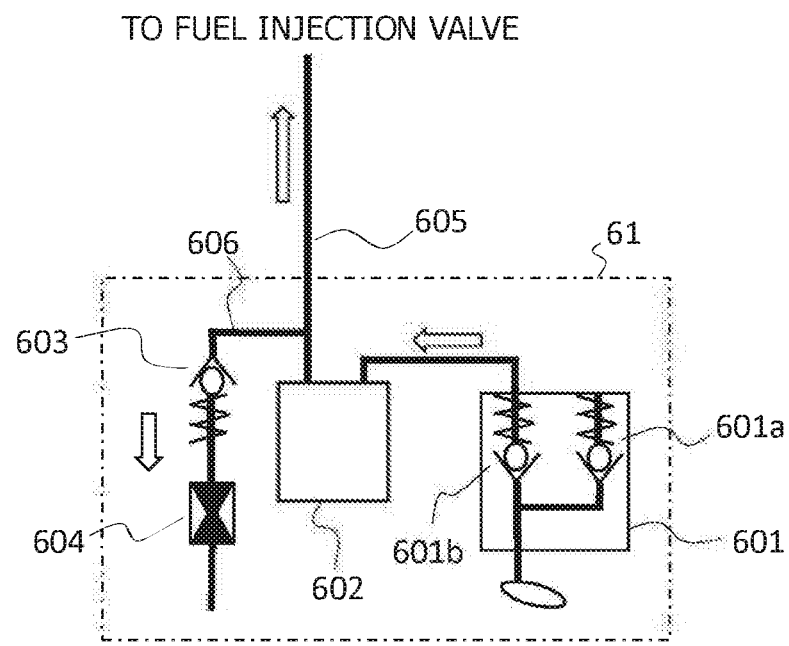
FIG. 4 is a view illustrating a configuration of a fuel pump module.

FIG. 4 illustrates the configuration of fuel pump module 61.

Fuel pump module 61 has an electric fuel pump 601, a fuel filter 602, a pressure regulator 603, an orifice 604, fuel supply piping 605, and fuel return piping 606.

Electric fuel pump 601 has a relief valve 601a and a check valve 601b (one-way valve), in which relief valve 601a opens when the discharge pressure exceeds the upper limit pressure to relieve the fuel that is discharged by electric fuel pump 601 into fuel tank 62, and in which check valve 601b prevents the fuel from flowing back to the discharge port of electric fuel pump 601.

Fuel filter 602 filters the fuel discharged by electric fuel pump 601 and supplies the fuel to fuel injection valve 21.

The base end of fuel return piping 606 connects to fuel supply piping 605 in fuel tank 62, and the tip of fuel return piping 606 opens inside fuel tank 62.

Pressure regulator 603 is the valve that opens and closes fuel return piping 606.

When the fuel pressure in fuel supply piping 605 exceeds the set pressure (valve opening pressure), pressure regulator 603 opens to return the fuel discharged by electric fuel pump 601 to the inside of fuel tank 62 so as to reduce rise in fuel pressure.

Orifice 604 adjusts the flow rate of the fuel that returns to fuel tank 62 when fuel pressure regulator 603 opens.

Here, since orifice 604 limits the flow rate of the fuel that returns to fuel tank 62, it is possible to boost the fuel pressure in fuel supply piping 605 to the valve opening pressure of pressure regulator 603 or higher by adjusting the discharge amount of electric fuel pump 601.

A fuel pressure sensor 63 detects the pressure in fuel supply piping 605 as the pressure of the fuel to be supplied to fuel injection valve 21 by fuel pump module 61 (hereinafter, referred to as a fuel pressure FP).

Returning to FIG. 1, a fuel control module (FCM) 64 controls drive of electric fuel pump 601.

FCM 64 is the electronic control device that includes, for example, the microcomputer having the processor and memory, and the motor drive circuit of electric fuel pump 601. FCM 64 performs fuel pressure feedback control for adjusting the discharge amount (driving voltage) of electric fuel pump 601 so that fuel pressure FP that is detected by fuel pressure sensor 63 approaches a target fuel pressure TFP.

Each cylinder in internal combustion engine 11 includes an ignition device 24 that has an ignition coil 22 and an ignition plug 23.

The spark ignition by ignition plug 23 causes the air-fuel mixture in combustion chamber 17 to ignite and combust, and the exhaust gas generated in combustion chamber 17 as a result of the combustion flows into the exhaust system through an exhaust valve 25 and an exhaust port 26 that are provided in each cylinder.

The exhaust system of internal combustion engine 11 includes a first catalyst device 31 that is arranged immediately below the collecting part where exhaust ports 26 of the respective cylinders are gathered, and a second catalyst device 33 that is arranged in an exhaust duct 32 that is provided downstream of first catalyst device 31.

First catalytic device 31 and second catalytic device 33 include three-way catalysts.

Intake valve 16 and exhaust valve 25 in internal combustion engine 11 perform the opening and closing operations at the valve timing of occurrence of valve overlap in which the open period of intake valve 16 and the open period of exhaust valve 25 partially overlap with each other.

Furthermore, internal combustion engine 11 may include at least one of the variable valve timing mechanism of intake valve 16 or the variable valve timing mechanism of exhaust valve 25.

In this case, the variable valve timing mechanism adjusts the valve timing at which the valve overlap occurs at least in a part of the operating region of the internal combustion engine, for example, in a predetermined high load and high rotation region.

Internal combustion engine 11 also includes an air-fuel ratio sensor 34 which is the air-fuel ratio detector located upstream of first catalyst device 31. Air-fuel ratio sensor 34 detects an exhaust air-fuel ratio RABF upstream of first catalyst device 31.

Furthermore, internal combustion engine 11 includes an exhaust gas recirculation device 43. Exhaust gas recirculation device 43 has an exhaust gas recirculation pipe 41 which communicates exhaust port 26 and intake collector 14, and has an exhaust gas recirculation control valve 42 which adjusts the opening area of exhaust gas recirculation pipe 41, in other words, the exhaust gas recirculation amount.

An engine control module (ECM) 51 is the electronic control device that includes the microcomputer that has the processor and memory. ECM 51 controls electronically controlled throttle valve 13, fuel injection valve 21, ignition device 24, exhaust gas recirculation device 43 and the like based on the operation state of internal combustion engine 11.

ECM 51 is the fuel injection control device in which the function of the injection period control unit for controlling the fuel injection by fuel injection valve 21 is included as software.

ECM 51 reads various signals output from various sensors which detect the operation state of internal combustion engine 11, and performs the calculation process of the read various signals in accordance with the control program. In this way, ECM 51 determines various manipulated variable such as the injection pulse width of fuel injection valve 21 and determines target fuel pressure TFP.

Then, ECM 51 outputs the determined various manipulated variable to fuel injection valve 21 and the like, and sends the data of target fuel pressure TFP to FCM 64.

ECM 51 receives detection signals such as the detection signal of exhaust air-fuel ratio RABF output from air-fuel ratio sensor 34, the detection signal of an intake air flow rate QA of internal combustion engine 11 output from air flow meter 12, the detection signal of a rotating angle position POS of a crank shaft 53 output from a crank angle sensor 52, the detection signal of a cooling water temperature TW of internal combustion engine 11 output from a water temperature sensor 54, and the detection signal of a stepping-in amount ACC of an accelerator pedal 56 output from an accelerator opening sensor 55.

In regard to the fuel injection controlled by fuel injection valve 21, in the case where the open period of intake valve 16 and the open period of exhaust valve 25 overlap at least partially with each other, ECM 51 lets fuel injection valve 21 perform fuel injection during the period of fuel injection from after the closing timing of exhaust valve 25 to the timing at which the deceleration rate of intake air speed becomes a local maximum.

Note that the deceleration rate of intake air speed is the decreasing variation per unit time of the intake air speed at the intake port.

ECM 51 lets fuel injection valve 21 start fuel injection after the closing timing of exhaust valve 25 so as to avoid the fuel injection before the opening of intake valve 16 and during the valve overlap period.

If fuel injection valve 21 injects fuel before the opening of intake valve 16, the fuel stays in intake port 15 that is located upstream of intake valve 16, and the fuel that stays in intake port 15 may adhere to the inner wall of intake port 15 due to the blowback of intake air that occurs when intake valve 16 opens.

However, since ECM 51 does not let fuel injection valve 21 perform fuel injection before the opening of intake valve 16, the fuel can be prevented from adhering to the inner wall of intake port 15 due to the intake blowback during the opening of intake valve 16.

Additionally, if fuel injection valve 21 injects fuel during the valve overlap period, it may cause the fuel to blow through the exhaust passage. However, since ECM 51 does not let fuel injection valve 21 perform fuel injection during the valve overlap period, the fuel can be prevented from blowing through the exhaust passage.

Furthermore, the intake air speed increases after the intake valve 16 opens and decreases after the intake air speed becomes a local maximum. Thus, if the period from after reaching the local maximum intake air speed to the timing to end injection is long, the fuel that is injected by fuel injection valve 21 during the slow intake air speed, which is just before the timing to end injection, does not mix well with the air. As a result, the homogeneity of in-cylinder air-fuel mixture decreases and the fuel efficiency deteriorates.

Therefore, in order to terminate the fuel injection by fuel injection valve 21 at the timing when the mixing of fuel and air can be sufficiently promoted, ECM 51 sets the timing to end injection based on the timing at which the deceleration rate of intake air speed becomes the local maximum. As such, the mixing of fuel and air is promoted, the in-cylinder air-fuel ratio dispersion is reduced, and the fuel efficiency is improved.

Furthermore, fuel injection valve 21 atomizes and injects fuel so that the fuel spray can be carried by the intake airflow and be directly injected into the cylinders, and the adhesion of the fuel spray to the cylinder bore, for example, can be prevented.

Figure 5:
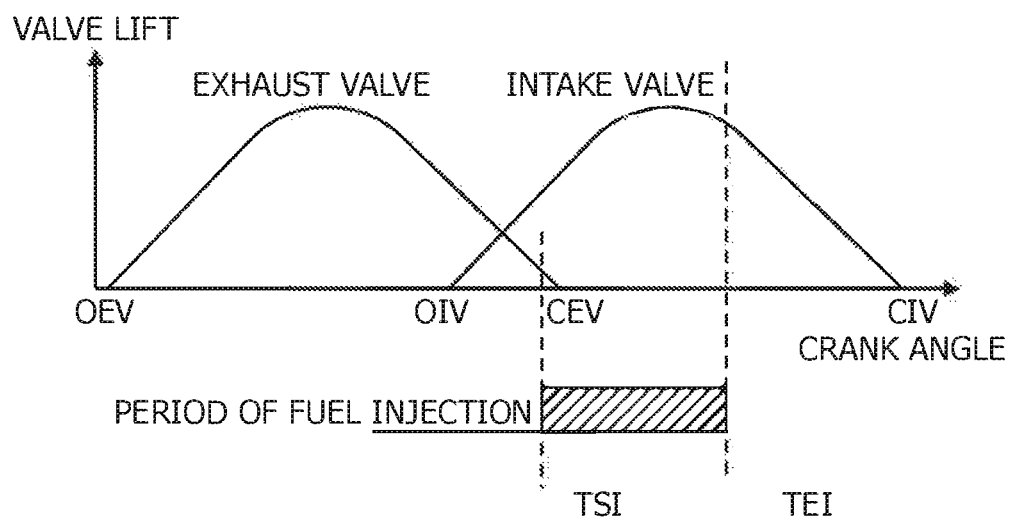
FIG. 5 is a view illustrating a correlation between a period of fuel injection by the fuel injection valve and a valve lift.

FIG. 5 illustrates the period of fuel injection that is set by ECM 51, and illustrates the correlation of the valve lift of intake valve 16 and exhaust valve 25 with a period of fuel injection PIF by fuel injection valve 21.

FIG. 5 illustrates opening timing OEV of exhaust valve 25, closing timing CEV of exhaust valve 25, opening timing OIV of intake valve 16, and closing timing CIV of intake valve 16.

In FIG. 5, the open period of intake valve 16 and the open period of exhaust valve 25 overlap with each other, and closing timing CEV of exhaust valve 25 comes after opening timing OIV of intake valve 16.

Here, ECM 51 determines closing timing CEV of exhaust valve 25 as timing to start injection TSI by fuel injection valve 21. ECM 51 also identifies, from the engine operation state, the timing at which the deceleration rate of the intake air speed becomes the local maximum which is within the open period of intake valve 16 after closing timing CEV, and determines such timing as timing to end injection TEI.

ECM 51 outputs the injection pulse signal that has the injection pulse width (ms) corresponding to period of fuel injection PIF from timing to start injection TSI to timing to end injection TEI, to fuel injection valve 21 at the timing of period of fuel injection PIF. As such, ECM 51 lets fuel injection valve 21 open and perform fuel injection during period of fuel injection PIF from timing to start injection TSI to timing to end injection TEI.

Furthermore, ECM 51 obtains target fuel pressure TFP in order for fuel injection valve 21 to inject the necessary amount of fuel for forming the air-fuel mixture of the target air-fuel ratio (hereinafter, also referred to as the required injection amount) during period of fuel injection PIF, and sends the data of such target fuel pressure TFP to FCM 64.

That is, ECM 51 controls the amount of fuel to be injected by fuel injection valve 21 per unit time by adjusting fuel pressure FP such that fuel injection valve 21 which opens only during the time corresponding to period of fuel injection PIF from timing to start injection TSI to timing to end injection TEI injects the required injection amount.

Figure 6:
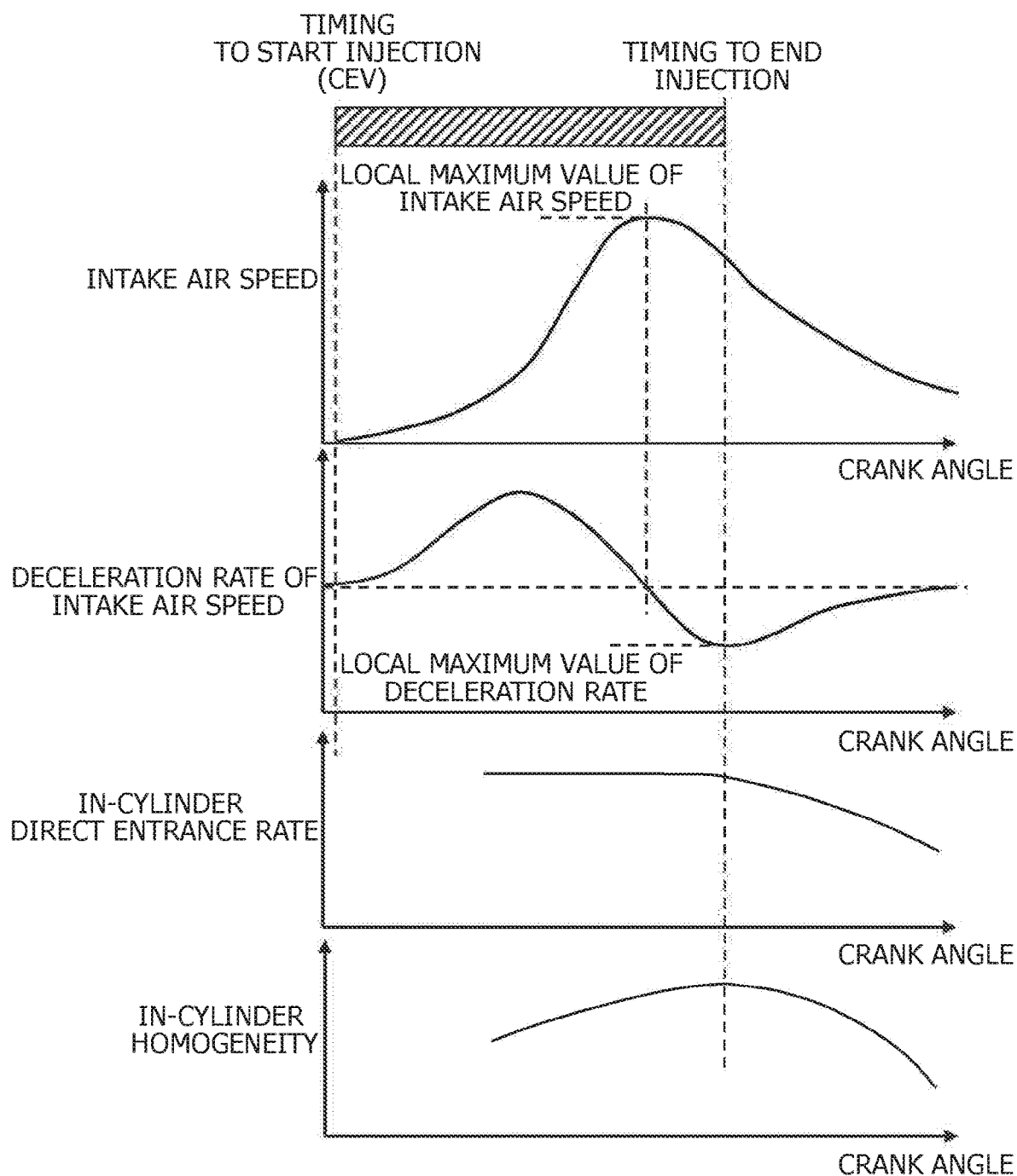
FIG. 6 is a view illustrating a correlation between a timing to end injection by the fuel injection valve and an intake air speed.

FIG. 6 illustrates the differences in forming the air-fuel mixture depending on timing to end injection TEL FIG. 6 illustrates the correlation between the crank angle and the intake air speed, and the correlation between the crank angle and the intake air speed deceleration rate. FIG. 6 also illustrates the change in the in-cylinder direct entrance rate depending on timing to end injection TEI and the change in the in-cylinder homogeneity depending on timing to end injection TEI.

ECM 51 sets timing to end injection TEI by fuel injection valve 21 to the timing when the deceleration rate of intake air speed becomes the local maximum after the intake air speed becomes the local maximum.

Here, the deceleration rate of intake air speed is the speed of decreasing the intake air speed, in other words, the amount of decrease of the intake air speed per unit time, and the timing at which the decrease rate (the amount of decrease) turns from increase to decrease is the timing at which the deceleration rate becomes the local maximum.

The crank angle position at which the deceleration rate of intake air speed becomes the local maximum varies mainly depending on engine rotation speed EN, and if the engine rotation speed EN is higher, the crank angle position is more retarded from the intake top dead center.

Thus, ECM 51 stores in the nonvolatile memory the table which determines, for each engine rotation speed, timing to end injection TEI which is the crank angle position at which the deceleration rate of intake air speed becomes the local maximum. ECM 51 retrieves the timing to end injection corresponding to current engine rotation speed EN from the table.

As illustrated in FIG. 6, if the timing to end injection by fuel injection valve 21 becomes later compared to the timing at which the deceleration rate of intake air speed becomes the local maximum, the proportion of the fuel directly entering the cylinder becomes accordingly less due to the reduction of intake air speed, and thus, the homogeneity of air-fuel mixture degrades. That is, the timing at which the deceleration rate of intake air speed becomes the local maximum is a limit of retardation of the timing at which the intake air speed exceeds a predetermined flow speed after the intake air speed becomes the local maximum, and the in-cylinder direct entrance rate can be maintained high by terminating the fuel injection when the intake air speed exceeds a predetermined flow speed.

If timing to end injection TEI by fuel injection valve 21 is advanced beyond the timing at which the deceleration rate of in-cylinder intake air speed becomes the local maximum, fuel is not injected by fuel injection valve 21 while the relatively high intake air speed is maintained, and only the air with high flow speed flows into the cylinder. In this case also, the homogeneity of the air-fuel mixture degrades.

That is, if the timing to end injection TEI deviates more from the timing at which the deceleration rate of in-cylinder intake air speed becomes the local maximum, the homogeneity of the air-fuel mixture accordingly degrades. Thus, if timing to end injection TEI is the timing at which the deceleration rate of in-cylinder intake air speed becomes the local maximum, the homogeneity becomes closer to the best, and the fuel efficiency can be improved.

Therefore, ECM 51 can set the period of fuel injection that can achieve the sufficiently high homogeneity of in-cylinder air-fuel mixture by determining timing to end injection TEI to be the timing at which the deceleration rate of intake air speed becomes the local maximum.

Furthermore, ECM 51 sets timing to start injection TSI to closing timing CEV of exhaust valve 25, so that while fuel spray is prevented from blowing through the exhaust passage, ECM 51 can inject fuel as long as possible while the intake air is flowing, and thus ECM 51 can contribute to improving the homogeneity.

Note that ECM 51 can set timing to end injection TEI close to the timing at which the deceleration rate of the in-cylinder intake air speed becomes the local maximum and within the range that can be estimated that the intake air speed exceeds a predetermined flow speed.

For example, ECM 51 can determine, as timing to end injection TEI, a position that is advanced or retarded by a predetermined crank angle from the timing when the deceleration rate of intake air speed becomes the local maximum.

As such, ECM 51 lets fuel injection valve 21 perform fuel injection during the period of fuel injection which is from the closing of exhaust valve 25 to the timing at which the deceleration rate of in-cylinder intake air speed becomes the local maximum, and adjusts fuel pressure FP so as to control the amount of fuel that is injected by fuel injection valve 21 during the period of fuel injection to be the required injection amount.

Figure 7:
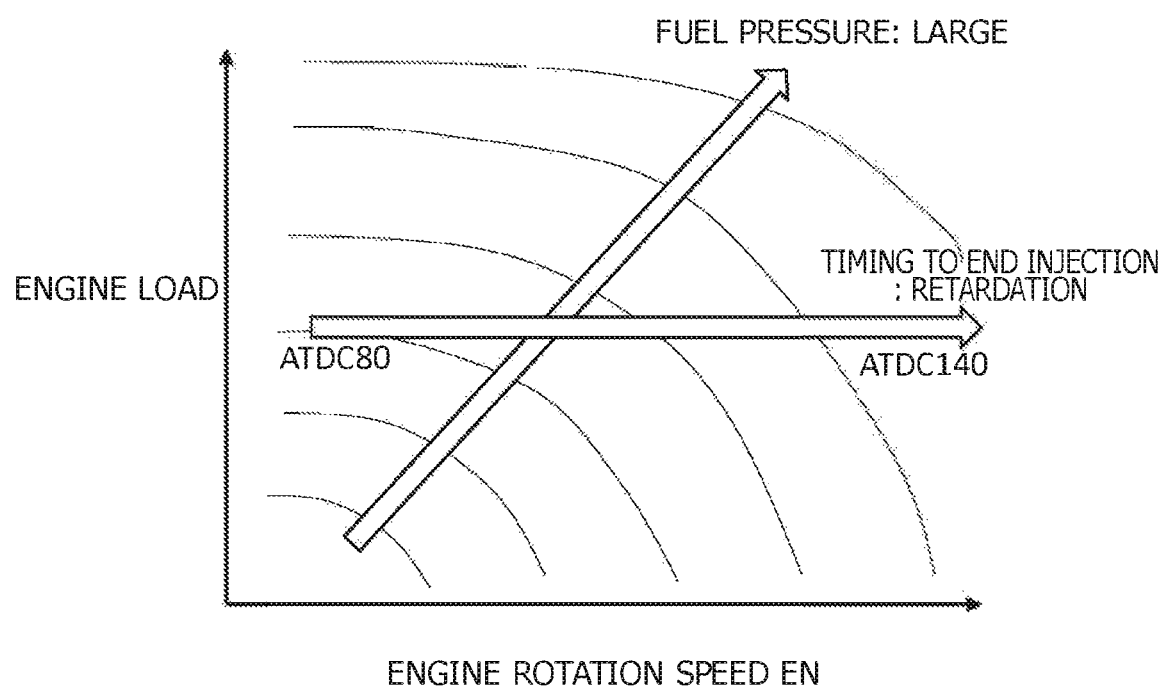
FIG. 7 is a view illustrating a correlation of an engine load and an engine rotation speed with a fuel pressure and the timing to end injection.

FIG. 7 illustrates the correlation of the engine load and engine rotation speed EN with the crank angle position at which the deceleration rate of intake air speed becomes the local maximum, that is, timing to end injection TEI, and the correlation of the engine load and engine rotation speed EN with target fuel pressure TFP.

As for the crank angle position at which the deceleration rate of intake air speed becomes the local maximum as illustrated in FIG. 7, if the engine rotation speed EN is higher, the crank angle position is more retarded from the intake top dead center, and the crank angle position varies between about 80 degrees ATDC to about 140 degrees ATDC in the example illustrated in FIG. 7.

Additionally, when ECM 51 sets the crank angle position at which the deceleration rate of intake air speed becomes the local maximum to timing to end injection TEI and sets closing timing CEV of exhaust valve 25 to timing to start injection TSI, in order for fuel injection valve 21 to inject the amount of fuel necessary for forming the air-fuel mixture of the target air-fuel ratio, if the engine load becomes higher, ECM 51 adjusts the fuel pressure FP to be accordingly higher, and if the engine rotation speed EN becomes higher, ECM 51 adjusts the fuel pressure FP to be accordingly higher.

Here, in the case of the deceleration of internal combustion engine 11 in which the fuel cut off is not performed, ECM 51 reduces target fuel pressure TFP in accordance with the reduction in the engine load and/or engine rotation speed EN.

However, fuel pump module 61 is the system in which the fuel pressure is reduced by the fuel injection from fuel injection valve 21 and the relief of fuel through orifice 604, and thus, the response that decreases fuel pressure FP is slower than the response that increases fuel pressure FP.

Therefore, when decelerating with target fuel pressure TFP being reduced, a delay occurs until actual fuel pressure FP reaches target fuel pressure TFP, and thus, fuel injection valve 21 injects fuel when actual fuel pressure FP is higher than target fuel pressure TFP, that is, when the injection amount of fuel per unit time is greater than the setting.

Furthermore, if the injection amount of fuel per unit time is greater than the target, the amount of fuel injected by fuel injection valve 21 in the period of fuel injection is also greater than the required injection amount accordingly, and thus, an excessively richer air-fuel ratio is provided.

Therefore, when decelerating with the injection amount of fuel per unit time becoming greater than the target due to the response delay of fuel pressure FP, if the response of fuel pressure FP delays more, ECM 51 corrects the injection pulse width to be shorter than the period of fuel injection. As such, ECM 51 reduces the enrichment of the air-fuel ratio.

That is, ECM 51 shortens the injection pulse width for the injection amount of fuel per unit time that is greater than the target, and thus, brings the amount of fuel injected by fuel injection valve 21 close to the required injection amount.

Figure 8:
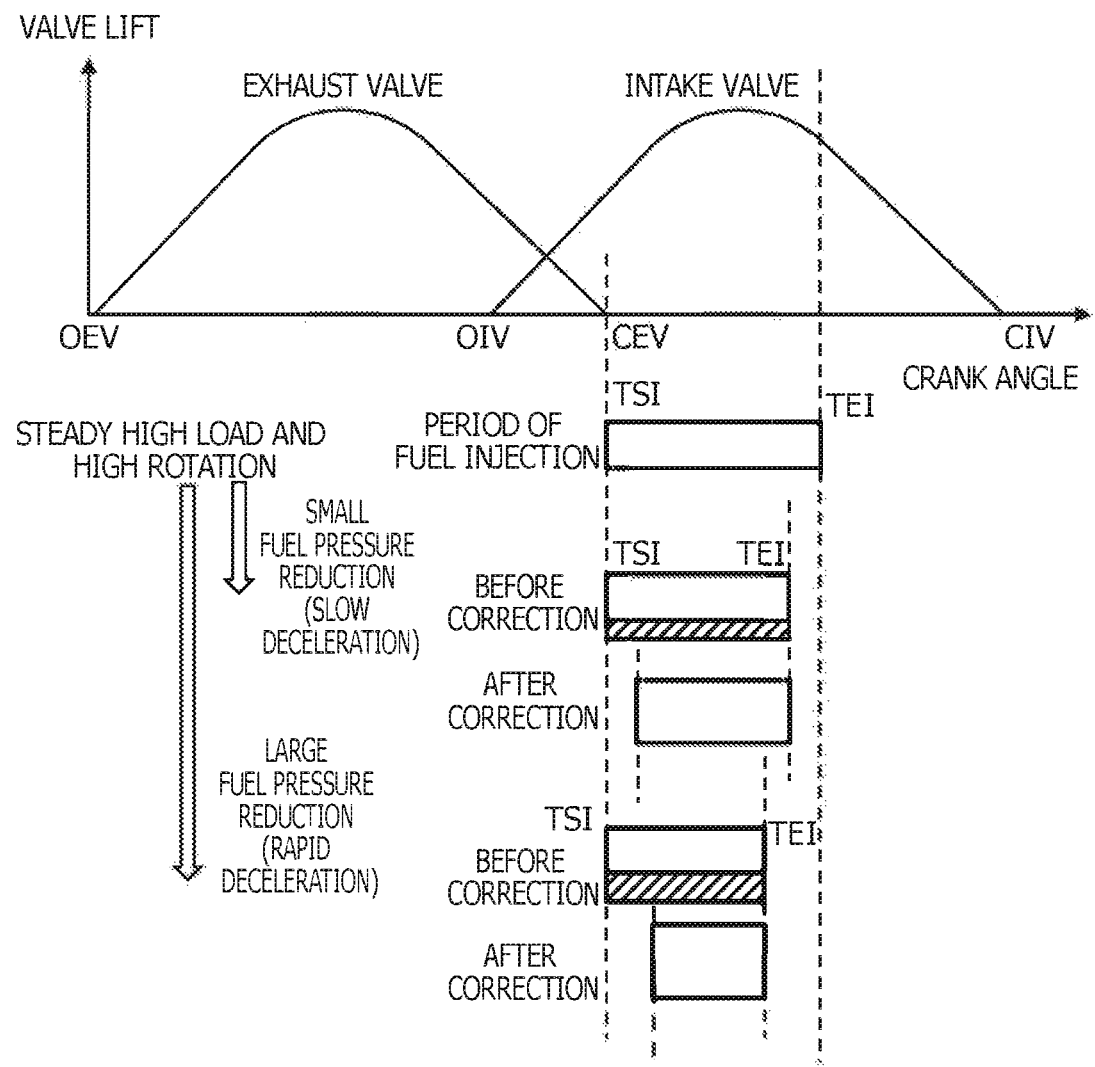
FIG. 8 is a view for illustrating the correction to shorten the period of fuel injection in a decelerating state.

FIG. 8 illustrates the correction processing of the injection pulse width when internal combustion engine 11 is decelerating.

When internal combustion engine 11 operates steadily in the high-load high-rotation range, ECM 51 performs fuel injection over the entire range of period of fuel injection in which closing timing CEV of exhaust valve 25 is timing to start injection TSI and the crank angle position at which the deceleration rate of intake air speed becomes the local maximum is timing to end injection TEI.

On the other hand, when internal combustion engine 11 decelerates from the high-load high-rotation range and ECM 51 lowers target fuel pressure TFP, there is a delay in actual fuel pressure FP to reach new target fuel pressure TFP from the state in which actual fuel pressure FP has been corresponding to target fuel pressure TFP in the high-load high-rotation range.

Therefore, fuel injection valve 21 injects fuel when actual fuel pressure FP is higher than target fuel pressure TFP and in which the injection amount of fuel per unit time is excessive.

That is, due to the difference between actual fuel pressure FP and target fuel pressure TFP that is lowered by ECM 51 as a consequence of the deceleration of internal combustion engine 11, fuel injection valve 21 injects an extra amount of fuel, which is indicated by hatching in FIG. 8.

Thus, when the injection amount of fuel per unit time transiently exceeds the target due to the deceleration of internal combustion engine 11, ECM 51 retards timing to start injection TSI from closing timing CEV of exhaust valve 25 so as to correct the period of fuel injection to be short. As such, ECM 51 brings the amount of fuel injected by fuel injection valve 21 close to the required injection amount.

In other words, when ECM 51 reduces the pressure of fuel supplied to fuel injection valve 21, ECM 51 temporarily changes the period of fuel injection by fuel injection valve 21 to be short within the time duration from closing timing CEV of exhaust valve 25 to the timing at which the deceleration rate of intake air speed becomes the local maximum.

Here, ECM 51 lowers target fuel pressure TFP when internal combustion engine 11 rapidly decelerates; however, since actual fuel pressure FP is maintained close to target fuel pressure TFP in the high-load high-rotation range before the deceleration, if the decrease in target fuel pressure TFP is greater, the difference between the changed target fuel pressure TFP and actual fuel pressure FP becomes accordingly greater, and thus, the injection amount of fuel per unit time becomes more excessive.

That is, if the decrease in the target fuel pressure TFP due to rapid deceleration of internal combustion engine 11 is greater, the response of the change in fuel pressure FP is delayed more and target fuel pressure TFP transiently further deviates from actual fuel pressure FP, and thus, the period of fuel injection needs to be shortened.

Therefore, ECM 51 sets the correction amount of shortening the period of fuel injection depending on the decrease rate of target fuel pressure TFP.

Figure 9:
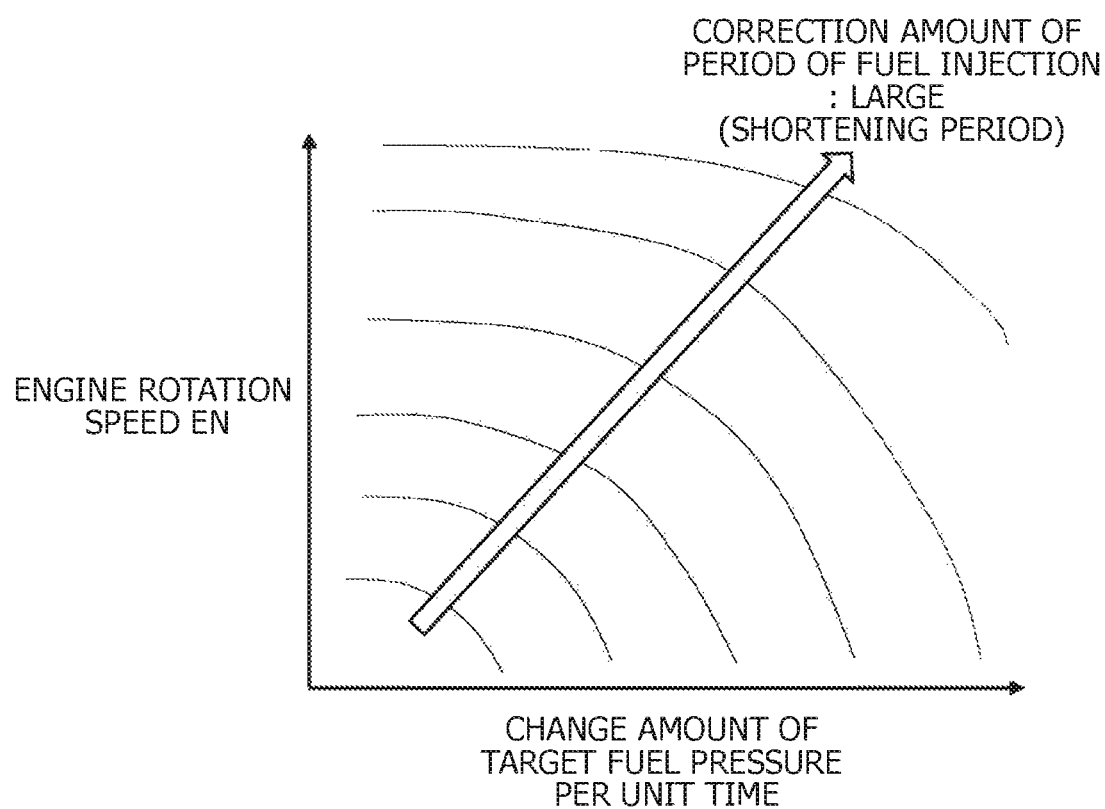
FIG. 9 is a view illustrating a correlation of the engine load and engine rotation speed with a correction amount of the injection period.

FIG. 9 illustrates the correlation between the correction amount of shortening the period of fuel injection and the decrease rate of target fuel pressure TFP and engine rotation speed EN.

In FIG. 9, the decrease rate of target fuel pressure TFP on the horizontal axis is the decreasing variation of target fuel pressure TFP per unit time, and if the decrease rate of target fuel pressure TFP is higher, the response delay of fuel pressure FP becomes accordingly greater.

In the characteristics illustrated in FIG. 9, if the decrease rate of target fuel pressure TFP is greater, the correction amount of shortening the period of fuel injection is set to be greater, that is to say that the period of fuel injection is corrected to be accordingly shorter. This is because if the decrease rate of target fuel pressure TFP becomes higher, target fuel pressure TFP transiently further deviates from actual fuel pressure FP, and the injection amount of fuel per unit time becomes more excessive.

Furthermore, if the engine rotation speed EN is higher, the fuel injection interval becomes shorter, and the reduction margin of fuel pressure FP is small until the next fuel injection starts. As a result, the response of the reduction of fuel pressure FP is delayed. Therefore, in the characteristics illustrated in FIG. 9, if the engine rotation speed EN is higher, the correction amount of shortening the period of fuel injection is set to be larger, that is, the period of fuel injection is corrected to become shorter.

Note that ECM 51 can set the correction amount of shortening the period of fuel injection based on the variation of accelerator opening ACC and the variation of throttle opening TVO, each of which is the state quantity correlated with the decrease rate of target fuel pressure TFP.

On the other hand, ECM 51 increases target fuel pressure TFP in the accelerating state of internal combustion engine 11. When target fuel pressure TFP increases, the response delay of actual fuel pressure FP is small as compared to when target fuel pressure TFP decreases.

However, since fuel pressure FP is transiently in the state of insufficient fuel pressure which is lower than target fuel pressure TFP, the fuel injection amount may not reach the required injection amount even if fuel is injected over the entire range of period of fuel injection from closing timing CEV of exhaust valve 25 to the crank angle position at which the deceleration rate of intake air speed becomes the local maximum, and thus, the injection amount may be insufficient.

Therefore, when ECM 51 increases target fuel pressure TFP in association with the acceleration of internal combustion engine 11, ECM 51 controls the response speed of the intake air amount of internal combustion engine 11 such that target fuel pressure TFP changes with the transient response that can be substantially followed by actual fuel pressure FP.

Figure 10:
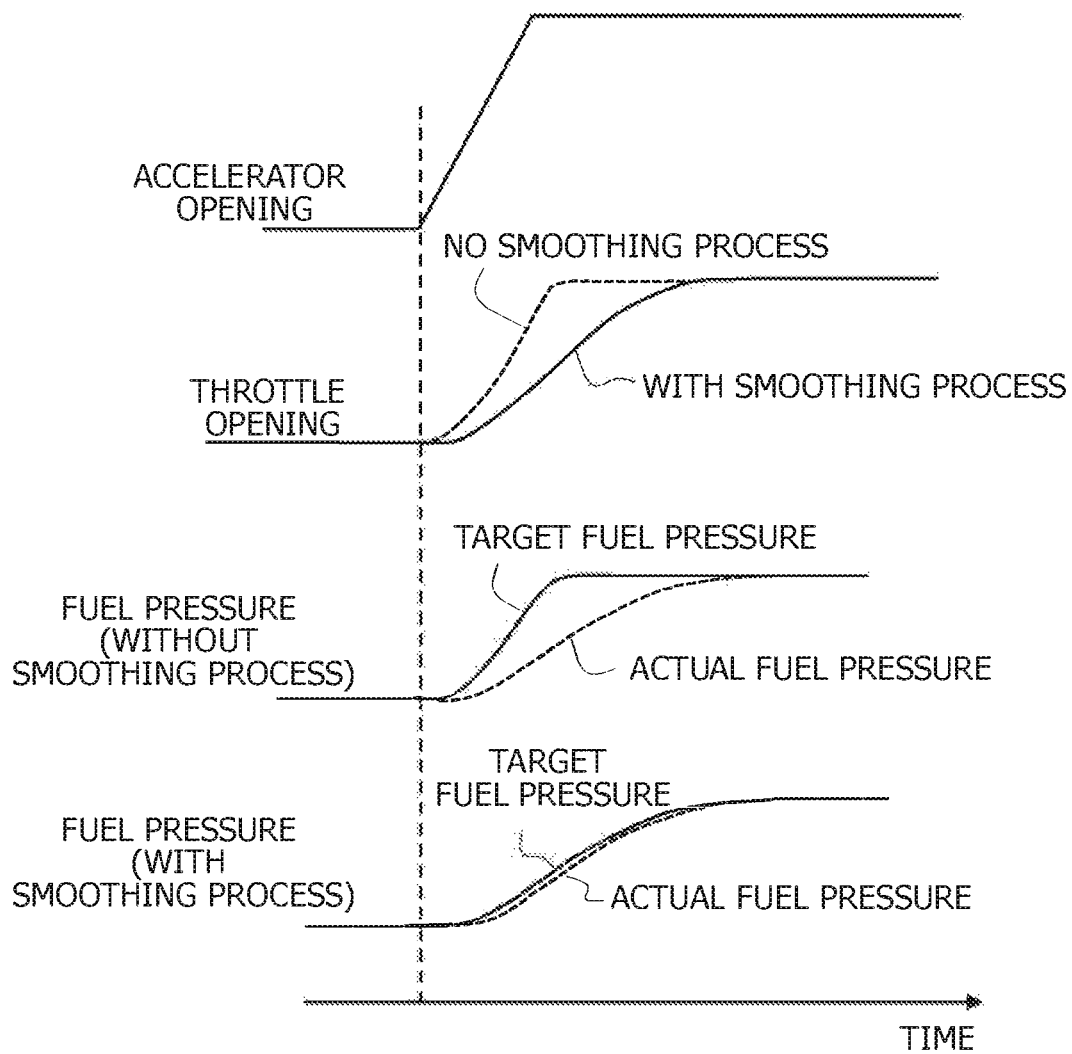
FIG. 10 is a time chart for illustrating the smoothing process of a throttle opening in an accelerating state.

The time chart of FIG. 10 illustrates the changes in accelerator opening ACC, throttle opening TVO, fuel pressure FP, and target fuel pressure TFP in the accelerating state of internal combustion engine 11.

As illustrated in FIG. 10, if throttle opening TVO is increased together with the increase in accelerator opening ACC when the driver of the vehicle depresses the accelerator pedal to accelerate internal combustion engine 11, there is a possibility that actual fuel pressure FP does not follow the increase in target fuel pressure TFP and that the fuel injection may be performed when fuel pressure FP is lower than target fuel pressure TFP.

Thus, as the process for slowing the response speed of throttle opening TVO, ECM 51 performs the smoothing process of the target throttle opening which is used for controlling the opening of electronically controlled throttle valve 13, for example.

That is, ECM 51 controls electronically controlled throttle valve 13 so that throttle opening TVO follows the increase in accelerator opening ACC with a delay.

ECM 51 suppresses the increase rate of target fuel pressure TFP by suppressing the response speed of throttle opening TVO so that actual fuel pressure FP and target fuel pressure TFP change without greatly deviating from each other and that the fuel injection is performed at fuel pressure FP close to target fuel pressure TFP.

Accordingly, when internal combustion engine 11 is accelerating and target fuel pressure TFP is increasing, ECM 51 prevents fuel from being injected when fuel pressure FP is lower than target fuel pressure TFP, and thus, suppresses reduction in the fuel measurement accuracy, that is, the air-fuel ratio control accuracy.

Figure 11:
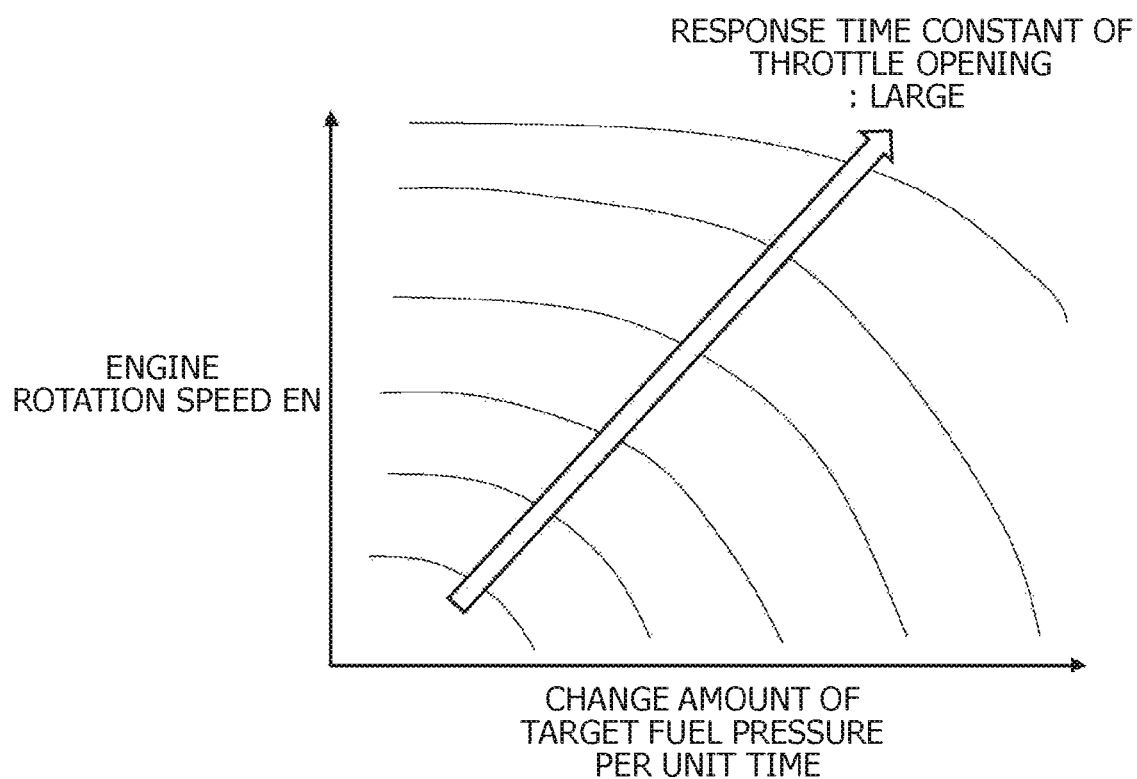
FIG. 11 is a view illustrating a correlation of the engine load and engine rotation speed with a response time constant of the throttle opening.

FIG. 11 illustrates the correlation of the targeted response time constant in the process of slowing the response speed of throttle opening TVO with the increase rate of target fuel pressure TFP and engine rotation speed EN.

In FIG. 11, the increase rate of target fuel pressure TFP on the horizontal axis is the increasing variation of target fuel pressure TFP per unit time, and if the increase rate of target fuel pressure TFP is greater, the response delay of fuel pressure FP becomes greater.

In the characteristics illustrated in FIG. 11, if the increase rate of target fuel pressure TFP is greater, the response time constant of throttle opening TVO is set to be longer, that is to say that the response time constant of throttle opening TVO is set to the value at which the response speed of the increase in throttle opening TVO becomes slower with respect to the increase in the accelerator opening.

That is, if the increase rate of target fuel pressure TFP becomes greater and actual fuel pressure FP deviates more from target fuel pressure TFP, ECM 51 retards the increase in throttle opening TVO with respect to the increase in accelerator opening ACC, and thus, prevents the increase rate of target fuel pressure TFP from becoming excessively great.

Controlling the transient response of throttle opening TVO as described above allows ECM 51 to prevent fuel injection valve 21 from injecting fuel when actual fuel pressure FP is lower than target fuel pressure TFP, and thus, ECM 51 avoids insufficient fuel injection amount which may cause an excessive lean shift of the air-fuel ratio.

Furthermore, if the engine rotation speed EN is higher, the fuel injection interval becomes shorter, and the increase margin of fuel pressure FP until starting the next fuel injection becomes small. As a result, the response of the increase in fuel pressure FP is delayed. Thus, in the characteristics illustrated in FIG. 11, if the engine rotation speed EN is higher, the response time constant of throttle opening TVO is set to be longer, that is to say that the response time constant of throttle opening TVO is set to the value that slows the response speed of the increase in throttle opening TVO.

Note that ECM 51 can set the response time constant of throttle opening TVO based on the variation of accelerator opening ACC and the variation of throttle opening TVO, each of which is the state quantity correlated with the increase rate of target fuel pressure TFP.

Figure 12:
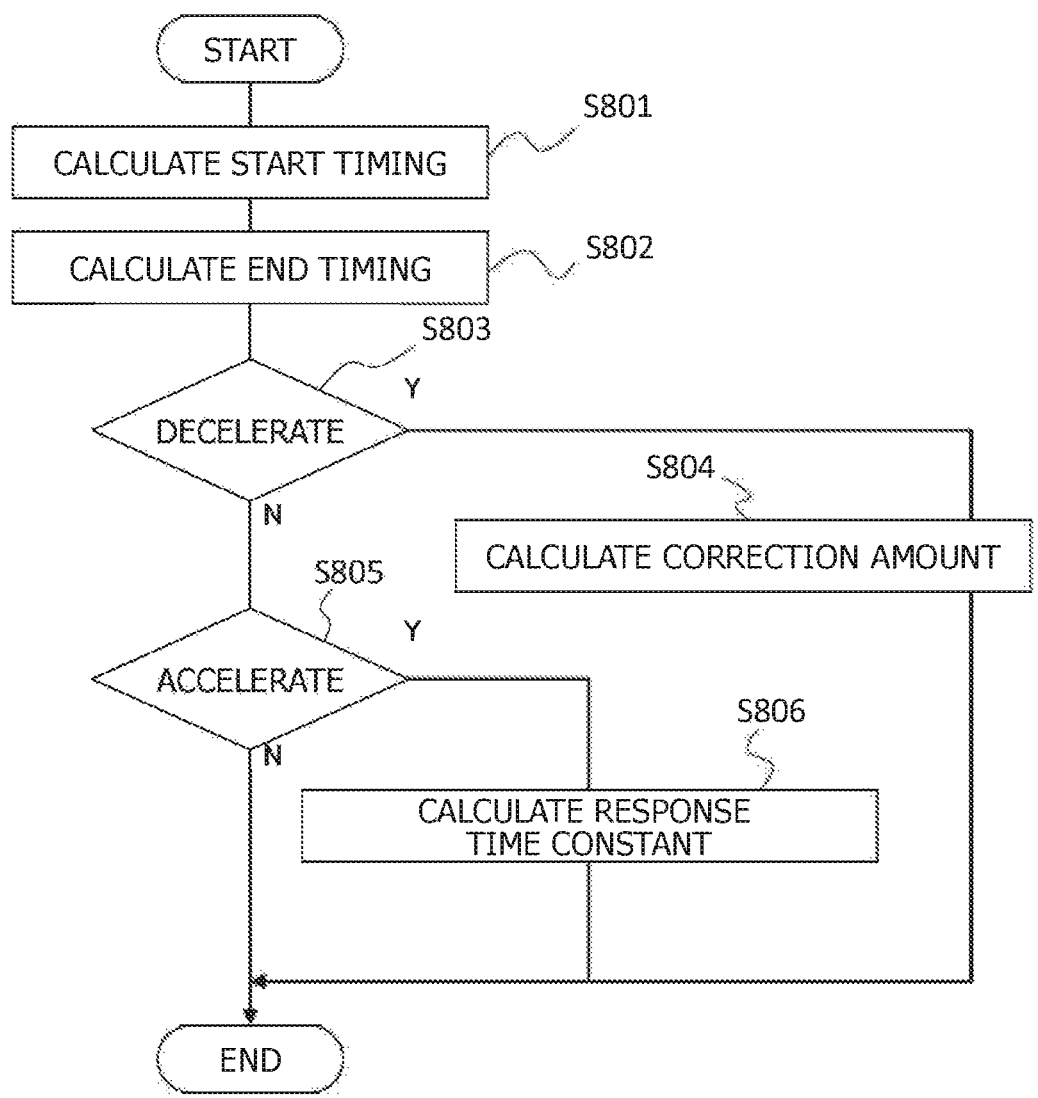
FIG. 12 is a flowchart illustrating a procedure of injection period control.

The flowchart of FIG. 12 illustrates the injection control procedure that is performed by ECM 51.

First, in step S801, ECM 51 sets timing to start injection TSI by fuel injection valve 21 to closing timing CEV of exhaust valve 25 which is the end of the valve overlap period.

Next, at step S802, ECM 51 sets timing to end injection TEI by fuel injection valve 21 to the crank angle position at which the deceleration rate of intake air speed becomes the local maximum.

The crank angle position at which the deceleration rate of intake air speed becomes the local maximum varies depending on the operating conditions of internal combustion engine 11, especially engine rotation speed EN. Thus, ECM 51 includes the map which stores, for each engine rotation speed EN, timing to end injection TEI which is the crank angle position at which the deceleration rate of intake air speed becomes the local maximum, and retrieves timing to end injection TEI to be applied to the present operating conditions from the map.

After ECM 51 determines timing to start injection TSI and timing to end injection TEI, ECM 51 calculates target fuel pressure TFP so as to inject the amount of fuel necessary for forming the air-fuel mixture of the target air-fuel ratio by injecting fuel during the period of fuel injection which is from timing to start injection TSI to timing to end injection TEI, and sends the data of calculated target fuel pressure TFP to FCM 64.

Next, in step S803, ECM 51 determines whether or not internal combustion engine 11 is decelerating.

If internal combustion engine 11 is decelerating with decreasing target fuel pressure TFP, ECM 51 proceeds to step S804. In Step 804, ECM 51 sets the correction amount for correcting the period of fuel injection to be shorter than the period from closing timing CEV of exhaust valve 25 to the crank angle position at which the deceleration rate of intake air speed becomes the local maximum, and uses the correction amount to correct the period of fuel injection to be short.

Here, as illustrated in FIG. 9, if the decrease rate of target fuel pressure TFP is higher, ECM 51 corrects the period of fuel injection to be shorter, and if engine rotation speed EN is higher, ECM 51 corrects the period of fuel injection to be accordingly shorter.

That is, in the decelerating state of internal combustion engine 11, if the decrease rate of target fuel pressure TFP is higher, ECM 51 corrects the period of fuel injection to be shorter than the period from closing timing CEV of exhaust valve 25 to the crank angle position at which the deceleration rate of intake air speed becomes the local maximum. As such, it is possible to reduce the excessive fuel injection that is caused by injecting fuel at fuel pressure FP higher than target fuel pressure TFP, and thus, reduce the enrichment of the air-fuel ratio.

Note that when ECM 51 corrects the period of fuel injection to be shorter than the period from closing timing CEV of exhaust valve 25 to the crank angle position at which the deceleration rate of intake air speed becomes the local maximum, ECM 51 can set timing to start injection TSI to be later than closing timing CEV of exhaust valve 25 such that timing to end injection TEI is in the crank angle position at which the deceleration rate of intake air speed becomes the local maximum.

Furthermore, ECM 51 can shorten the period of fuel injection by determining timing to start injection TSI as closing timing CEV of exhaust valve 25, and by advancing timing to end injection TEI more than the crank angle position at which the deceleration rate of intake air speed becomes the local maximum.

That is, when ECM 51 corrects the period of fuel injection to be short in the decelerating state of internal combustion engine 11, ECM 51 can appropriately set the injection timing within the period from closing timing CEV of exhaust valve 25 to the crank angle position at which the deceleration rate of intake air speed becomes the local maximum.

On the other hand, when internal combustion engine 11 is not decelerating, ECM 51 proceeds from step S803 to step S805, and determines whether internal combustion engine 11 is accelerating.

If internal combustion engine 11 is accelerating which increases target fuel pressure TFP, ECM 51 proceeds to step S806. In step S806, ECM 51 sets throttle opening TVO in the acceleration state, in other words, sets the response time constant of the intake air amount change, and changes throttle opening TVO according to the response time constant.

Here, as illustrated in FIG. 11, if the increase rate of target fuel pressure TFP is higher, ECM 51 sets the response time constant of throttle opening TVO to be accordingly longer, and if engine rotation speed EN is higher, ECM 51 sets the response time constant of throttle opening TVO to be accordingly longer.

In other words, when internal combustion engine 11 is accelerating, if the increase rate of target fuel pressure TFP is higher, ECM 51 sets the transient response of throttle opening TVO to be accordingly slower, and if engine rotation speed EN is higher, ECM 51 sets the transient response of throttle opening TVO to be accordingly slower.

That is, ECM 51 adjusts the transient response of throttle opening TVO in the accelerating state of internal combustion engine 11 so as to prevent actual fuel pressure FP from becoming lower than target fuel pressure TFP, and injects the amount of fuel necessary for forming the air-fuel mixture of the target air-fuel ratio by injecting fuel during the period from closing timing CEV of exhaust valve 25 to the crank angle position at which the deceleration rate of intake air speed becomes the local maximum.

Here, internal combustion engine 11 can be the single injection system in which each cylinder is provided with one fuel injection valve 21 as the fuel injection device, or can be the twin injection system in which each cylinder is provided with two fuel injection valves 21.

Figure 13:
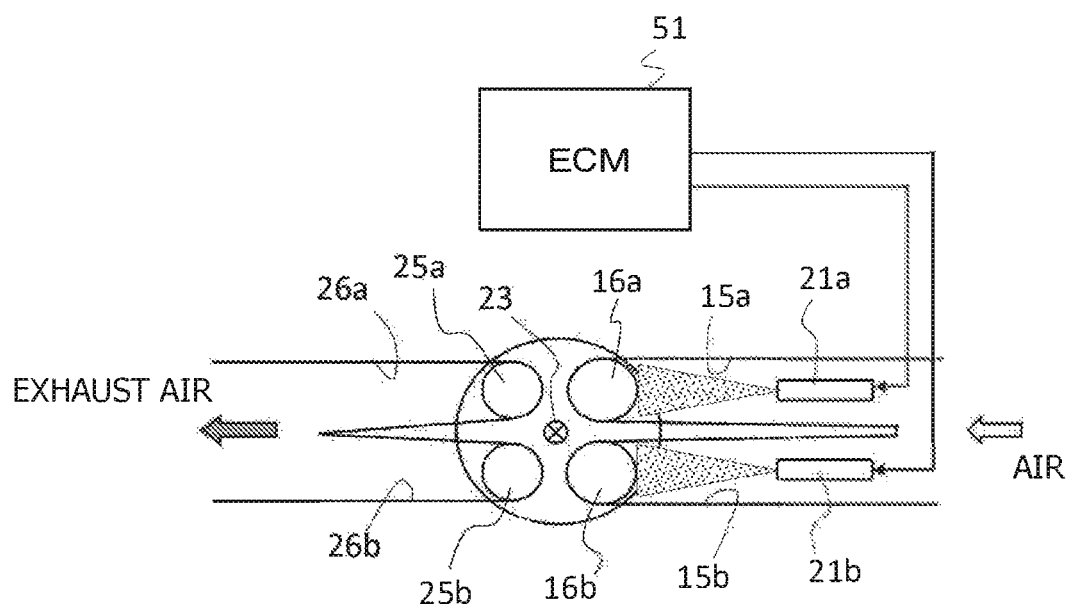
FIG. 13 is a view illustrating a twin injection system.

FIG. 13 illustrates an arrangement example of fuel injection valves 21 in the twin injection system.

Each cylinder in internal combustion engine 11 of FIG. 13 is provided with two intake ports 15a, 15b.

A first intake valve 16a opens and closes first intake port 15a, and a second intake valve 16b opens and closes second intake port 15b.

First intake port 15a includes a first fuel injection valve 21a for injecting fuel into first intake port 15a. Second intake port 15b includes a second fuel injection valve 21b for injecting fuel into second intake port 15b.

Fuel injection valves 21a, 21b, for example, include the means for imparting a swirling force to fuel (see FIGS. 2 and 3), and the fuel injection valves 21a, 21b can effectively promote the atomization of fuel after injection.

The spark ignition by ignition plug 23 causes the air-fuel mixture in combustion chamber 17 to ignite and combust, and the exhaust gas that is generated in combustion chamber 17 as a result of the combustion flows into the exhaust system through two exhaust valves 25a, 25b and two exhaust ports 26a, 26b provided in each cylinder.

Also, ECM 51 lets fuel injection valves 21a and 21b perform fuel injection in the twin injection system during the period of fuel injection from closing timing CEV of exhaust valve 25 to the crank angle position at which the deceleration rate of intake air speed becomes the local maximum.

Here, when ECM 51 performs correction to shorten the period of fuel injection in the decelerating state of internal combustion engine 11, ECM 51 can shift the phase of the period of fuel injection by first fuel injection valve 21a from the phase of the period of fuel injection by second fuel injection valve 21b.

Figure 14:
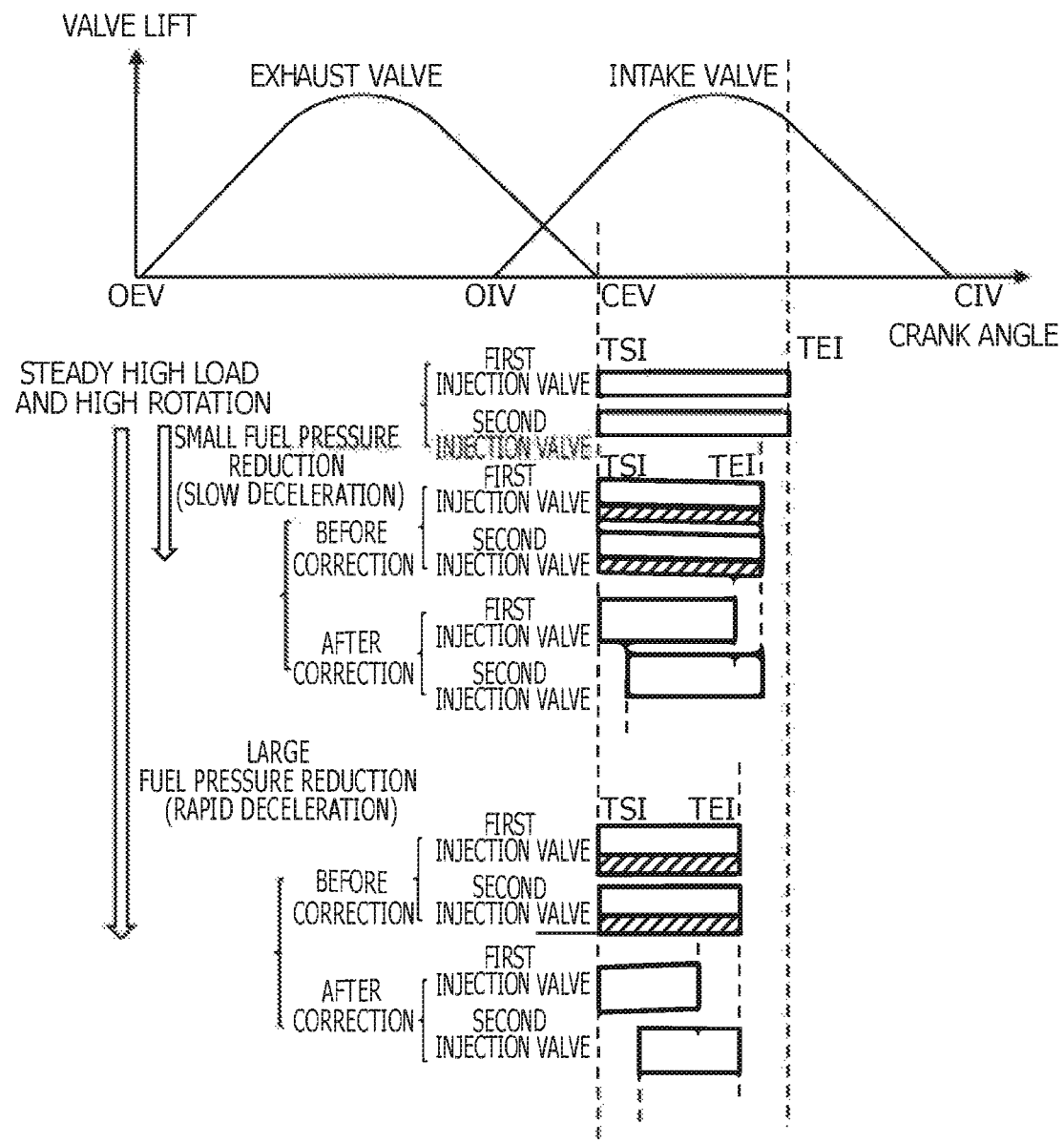
FIG. 14 is a view illustrating a phase of the period of fuel injection in the twin injection system.

For example, as illustrated in FIG. 14, when ECM 51 performs correction to shorten the period of fuel injection in the decelerating state of internal combustion engine 11, ECM 51 sets timing to start injection TSI by first fuel injection valve 21a to closing timing CEV of exhaust valve 25 and advances timing to end injection TEI by first fuel injection valve 21a more than the crank angle position at which the deceleration rate of intake air speed becomes the local maximum, while on the other hand, sets timing to end injection TEI of second fuel injection valve 21b to the crank angle position at which the deceleration rate of intake air speed becomes the local maximum and retards timing to start injection TSI by second fuel injection valve 21b.

That is, ECM 51 shifts the phase of the period of fuel injection by first fuel injection valve 21a from the phase of the period of fuel injection by second fuel injection valve 21b, and thus lets at least one of first fuel injection valve 21a and second fuel injection valve 21b inject fuel over the entire range of a period from closing timing CEV of exhaust valve 25 to the crank angle position at which the deceleration rate of intake air speed becomes the local maximum.

As such, ECM 51 can improve the homogeneity of the air-fuel mixture by shortening the period in which only the fresh air flows into combustion chamber 17 in the intake stroke, while shortening the period of fuel injection in the decelerating state of internal combustion engine 11 to prevent excessive fuel injection.

Figure 15:
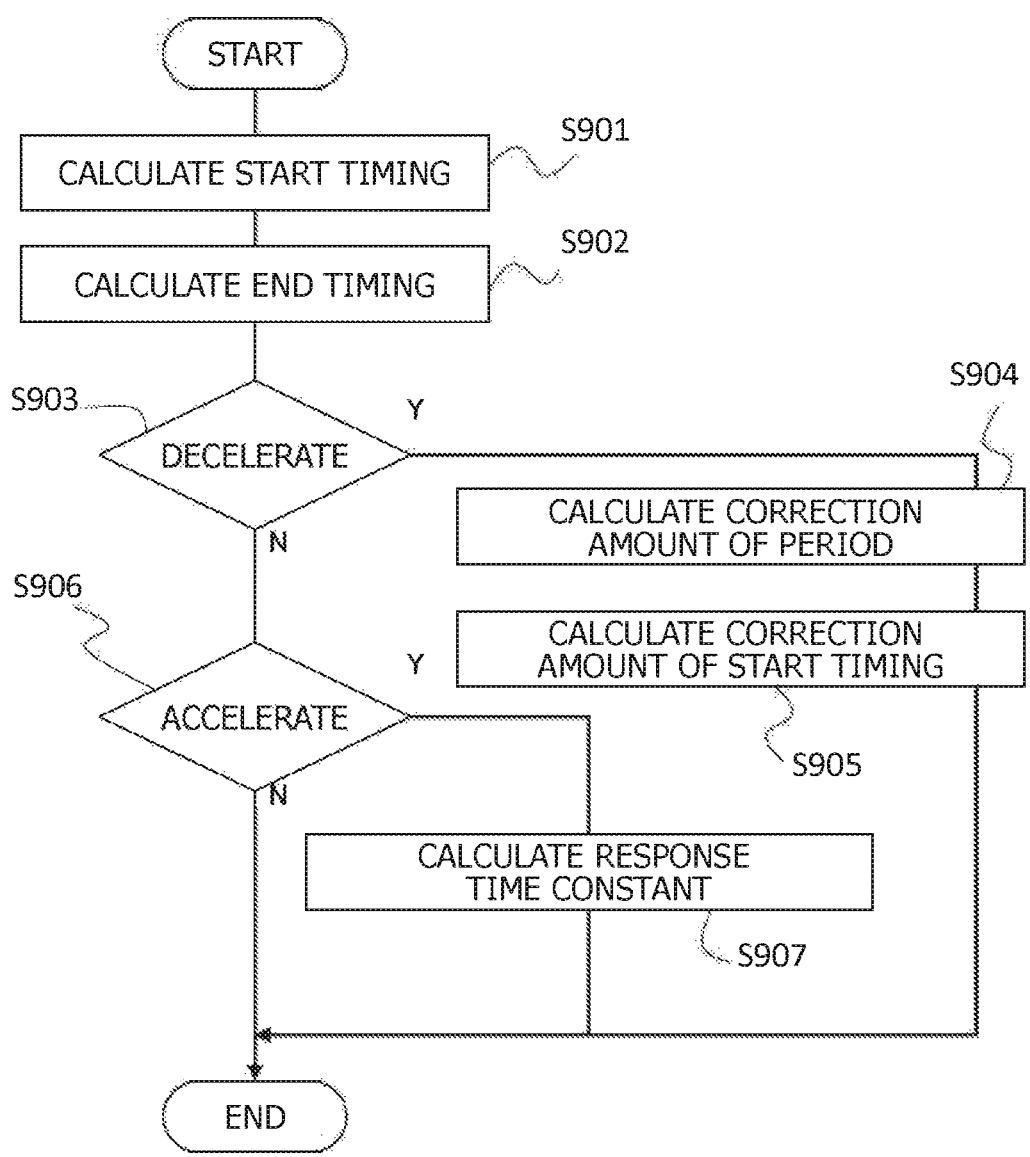
FIG. 15 is a flowchart illustrating a procedure of the injection period control in the twin injection system.

The flowchart of FIG. 15 illustrates the procedure of injection control by ECM 51 in the twin injection system.

The flowchart of FIG. 15 is different from the flowchart of FIG. 12 in that the phase control of the injection period in step S905 is added. Thus, steps other than step S905, that is, steps S901 to S904 and steps S906 to S907 practice the same calculation processing as steps S801 to S806 in the flowchart of FIG. 12.

Therefore, described below is the injection control during deceleration which is the process in step S905, and the processes in the other steps are not described in detail.

ECM 51 proceeds to step S904 when internal combustion engine 11 is in the decelerating state, and similar to step S804, based on the decrease rate of target fuel pressure TFP and engine rotation speed EN, corrects the period of fuel injection to be shorter than the period from closing timing CEV of exhaust valve 25 to the crank angle position at which the deceleration rate of intake air speed becomes the local maximum.

Furthermore, ECM 51 proceeds to step S905 when ECM 51 corrects the period of fuel injection to be short in the decelerating state of internal combustion engine 11.

In step S905, ECM 51 shifts the phase of the period of fuel injection by first fuel injection valve 21a from the phase of the period of fuel injection by second fuel injection valve 21b, and thus lets the fuel injection valves 21a, 21b inject fuel over the period that is longer than the individual periods of fuel injection by fuel injection valves 21a, 21b.

For example, ECM 51 sets timing to start injection TSI by first fuel injection valve 21a to closing timing CEV of exhaust valve 25, and advances timing to end injection TEI by first fuel injection valve 21a more than the crank angle position at which the deceleration rate of intake air speed becomes the local maximum. As such, ECM 51 shortens the period of fuel injection by first fuel injection valve 21a.

Furthermore, ECM 51 sets timing to end injection TEI by second fuel injection valve 21b to the crank angle position at which the deceleration rate of intake air speed becomes the local maximum, and retards timing to start injection TSI by second fuel injection valve 21b more than closing timing CEV of exhaust valve 25. As such, ECM 51 shortens the period of fuel injection by second fuel injection valve 21b.

Although specific embodiments of the present invention have been described, it should be understood that the present invention is not limited to thereto and may include various modifications. The above embodiments include details that are only intended to clearly illustrate the present invention. Thus, the present invention is not necessarily limited to embodiments having all the features described herein, for example.

Furthermore, one or more features of an embodiment herein may be replaced with corresponding features of another embodiment. Also, an embodiment herein may further include one or more features of another embodiment, and one or more features of an embodiment herein may be omitted.

In the above embodiments, ECM 51 as the fuel injection control device controls the amount of fuel injection per unit time by the fuel injection device by changing fuel pressure FP; however, the means for changing the fuel injection amount per unit time is not limited to adjusting fuel pressure FP.

For example, if the internal combustion engine includes the fuel injection device in which the maximum lift of the valve body is variable, the fuel injection control device can control the fuel injection amount per unit time by controlling the maximum lift of the fuel injection device.

Furthermore, if the internal combustion engine includes, for each cylinder, a plurality of types of fuel injection devices having different fuel injection amounts per unit time, the fuel injection control device can control the fuel injection amount per unit time by either selecting one fuel injection valve to perform fuel injection or by combining a plurality of fuel injection valves to perform fuel injection.

Furthermore, the fuel injection control device can control the fuel injection amount per unit time from the combination among adjusting fuel pressure FP, changing the maximum lift of the valve body of the fuel injection device, and selecting from the plurality of fuel injection devices.

Furthermore, the fuel injection control device can let the fuel injection device perform fuel injection during the period of fuel injection which is from the closing of exhaust valve to the timing at which the deceleration rate of intake air speed becomes the local maximum, for example, in the high load range in which the load in the internal combustion engine exceeds the set value, and perform fuel injection at the injection timing which is different from that of high load range in the case of the low load region in which the load of the internal combustion engine is equal to or less than the set value.

Furthermore, as the fuel injection device, internal combustion engine 11 may be provided with the two-way fuel injection valve that injects fuel toward each of the two intake ports, and each cylinder in internal combustion engine 11 may be provided with a plurality of such two-way fuel injection valves.

Furthermore, when the fuel injection control device corrects the period of fuel injection to be short in the decelerating state of the internal combustion engine, the fuel injection control device, while maintaining the timing to start injection to be the closing timing of exhaust valve, may advance the timing to end injection more than the crank angle position at which the deceleration rate of intake air speed becomes the local maximum, instead of retarding the timing to start injection from the closing timing of the exhaust valve.

Furthermore, when the fuel injection control device advances the timing to end injection more than the crank angle position at which the deceleration rate of intake air speed becomes the local maximum, the fuel injection control device can set the advance limit to, for example, the timing at which the intake air speed becomes the local maximum, and when the request to shorten the period of fuel injection is not met even if the timing to end injection is advanced to the advance limit, the fuel injection control device can retard the timing to start injection to be after the closing timing of the exhaust valve.

Furthermore, when the internal combustion engine is in the decelerating state and the fuel injection control device corrects the period of fuel injection by the fuel injection device to be short, the fuel injection control device may divide the shortened period of fuel injection and perform fuel injection by the fuel injection device for a plurality of times. Thus, such plurality of times of fuel injection in total may be regarded as the corrected period of fuel injection.

Furthermore, in both the transient and steady states of the internal combustion engine, the fuel injection control device can set the timing to start injection by the first fuel injection valve to closing timing CEV of the exhaust valve and change the timing to end injection by the first fuel injection valve in the crank angle area which is before the crank angle position at which the deceleration rate of intake air speed becomes the local maximum so as to control the amount of fuel injection by the first fuel injection valve, while on the other hand, the fuel injection control device can set the timing to end injection by the second fuel injection valve to the clank angle position at which the deceleration rate of intake air speed becomes the local maximum and change the timing to start injection by the second fuel injection valve in the crank angle area which after closing timing CEV of the exhaust valve so as to control the amount of fuel injection by the second fuel injection valve.

REFERENCE SYMBOL LIST

11 Internal combustion engine
15 Intake port (intake pipe)
16 Intake valve
25 Exhaust valve
51 ECM (fuel injection control device)

The invention claimed is:

1. A fuel injection control device for an internal combustion engine which has a fuel injection device arranged in an intake pipe that is located upstream of an intake valve, the fuel injection control device comprising:
an injection period control unit that lets the fuel injection device perform fuel injection, with a cylinder that has an open period of the intake valve and an open period of an exhaust valve overlap with each other, and that sets a timing to start injection to a closing timing of an exhaust valve and a timing to end injection to a timing at which a deceleration rate of intake air speed becomes a local maximum.

2. The fuel injection control device for the internal combustion engine according to claim 1, wherein the injection period control unit adjusts a pressure of fuel supplied to the fuel injection device to variably control an amount of fuel that is injected by the fuel injection device.

3. The fuel injection control device for the internal combustion engine according to claim 2, wherein the injection period control unit, when reducing the pressure of fuel supplied to the fuel injection device, temporarily changes the period of fuel injection by the fuel injection device to be shorter within a period from the closing timing of the exhaust valve to the timing at which the deceleration rate of the intake air speed becomes the local maximum than before reducing the pressure.

4. The fuel injection control device for the internal combustion engine according to claim 3, wherein as the decrease in the pressure of the fuel supplied to the fuel injection device is greater, the injection period control unit changes the period of fuel injection by the fuel injection device to be shorter.

5. The fuel injection control device for the internal combustion engine according to claim 3, wherein
the intake pipe includes a first intake port and a second intake port for each cylinder,
the fuel injection device includes a first fuel injection valve that is arranged in the first intake port and a second fuel injection valve that is arranged in the second intake port, and
when the injection period control unit temporarily changes the period of fuel injection by the first fuel injection valve and the period of fuel injection by the second fuel injection valve to be short, the injection period control unit shifts a phase of the period of fuel injection by the first fuel injection valve and a phase of the period of fuel injection of the second fuel injection valve.

6. The fuel injection control device for the internal combustion engine according to claim 5, wherein
when the injection period control unit temporarily changes the period of fuel injection by the first fuel injection valve and the period of fuel injection by the second fuel injection valve to be short,
the injection period control unit sets the timing to start injection by the first fuel injection valve to the closing timing of the exhaust valve, and sets the timing to end injection by the first fuel injection valve before the timing at which the deceleration rate of the intake air speed becomes the local maximum, and
the injection period control unit sets the timing to end injection by the second fuel injection valve to the timing at which the deceleration rate of the intake air speed becomes the local maximum, and sets the timing to start injection by the second fuel injection valve after the closing timing of the exhaust valve.

7. The fuel injection control device for the internal combustion engine according to claim 2, wherein when the injection period control unit increases the pressure of fuel in an accelerating state of the internal combustion engine, as the increase in the pressure of the fuel is greater, the injection period control unit controls the response speed of the intake air amount of the internal combustion engine to be accordingly slower.

8. The fuel injection control device for the internal combustion engine according to claim 1, wherein the fuel injection device comprises means for promoting atomization of fuel.

9. The fuel injection control device for the internal combustion engine according to claim 1, wherein the injection period control unit obtains the timing at which the deceleration rate of the intake air speed reaches the local maximum based on an operation state of the internal combustion engine.

10. A fuel injection control method for an internal combustion engine which has a fuel injection device arranged in an intake pipe that is located upstream of an intake valve, the method comprising the step of:
performing fuel injection by the fuel injection device with a cylinder that has an open period of the intake valve and an open period of an exhaust valve overlap, that sets a timing to start injection to a closing timing of the exhaust valve and a timing to end injection to a timing at which a deceleration rate of intake air speed becomes a local maximum.

11. The fuel injection control method for the internal combustion engine according to claim 10, further comprising the steps of:
adjusting a pressure of fuel supplied to the fuel injection device to variably control an amount of fuel that is injected by the fuel injection device, and
when reducing the pressure of fuel supplied to the fuel injection device, temporarily changing the period of fuel injection by the fuel injection device to be shorter within a period from the closing timing of the exhaust valve to the timing at which the deceleration rate of the intake air speed becomes the local maximum than before reducing the pressure.

* * * * *